(12) United States Patent
Pershan et al.

(10) Patent No.: US 6,968,050 B1
(45) Date of Patent: Nov. 22, 2005

(54) METHODS AND APPARATUS FOR AUTHENTICATING AND AUTHORIZING ENUM REGISTRANTS

(75) Inventors: Barry Paul Pershan, Olney, MD (US); Elizabeth A. Geddes, Washington, DC (US); Kevin V. Bohn, Rockville Centre, NY (US)

(73) Assignee: Verizon Services Corp., Arlington, VA (US)

( * ) Notice: Subject to any disclaimer, the term of this patent is extended or adjusted under 35 U.S.C. 154(b) by 723 days.

(21) Appl. No.: 10/108,052

(22) Filed: Mar. 27, 2002

(51) Int. Cl.[7] .............................................. H04M 3/00
(52) U.S. Cl. ............ 379/196; 379/221.08; 379/221.09; 379/207.11; 379/207.02
(58) Field of Search .......................... 379/196, 221.08, 379/221.09, 207.11, 207.02

(56) References Cited

U.S. PATENT DOCUMENTS

| | | | |
|---|---|---|---|
| 6,188,757 B1 * | 2/2001 | Malik .................... | 379/207.02 |
| 6,208,642 B1 * | 3/2001 | Balachandran et al. ..... | 370/385 |
| 6,731,731 B1 * | 5/2004 | Ueshima .................... | 379/196 |
| 6,748,067 B2 * | 6/2004 | Malik .................... | 379/114.2 |

OTHER PUBLICATIONS

Rimo, Tricia, *Enun Forum Contribution: Security and Privacy Task Group*, "Additional Considerations for Verifying and Authenticating Customer Information", dated Jan. 18, 2002, downloaded from http://www.enun-forum.org/seccontributions.asp, 3 pgs.

Engelman, Stephen J., *Enun Forum Contribution: Security and Privacy Task Group*, "Authentication and Verification Methods", dated Nov. 16, 2002, downloaded from http://www.enun-forum.org/seccontributions.asp, 5 pgs.

Rock, Eric, *Illuminet LIDB Solution, Enun Forum Contribution: Security and Privacy Task Group*, "Authentication", dated Oct. 18, 2001, downloaded from http://www.enun-forum.org/seccontributions.asp, 9 pgs.

* cited by examiner

*Primary Examiner*—Ahmad F. Matar
*Assistant Examiner*—Rasha S. Al-Aubaidi
(74) *Attorney, Agent, or Firm*—Leonard C. Suchyta, Esq.; Joseph R. Palmieri, Esq.; Alston & Bird LLP

(57) ABSTRACT

AIN based methods and apparatus for authenticating and authorizing people to register information corresponding to a telephone number, e.g., in an ENUM database, are described. The methods of the invention may be used to authenticate a party seeking to register telephone number related information with ENUM. A trigger is set on an ENUM registration line. Calls to the ENUM registration line activate the trigger causing LIDB information corresponding to the calling party number to be retrieved. The retrieved information, e.g., name, address and/or phone number is supplied to an ENUM registration service which returns a password to be used when updating or supplying ENUM registration information corresponding to the phone number from which the registration call is placed at some future time, e.g., via the Internet. Assigned ENUM passwords can be obtained when forgotten by placing a call to the registration service from the registered or associated phone number.

22 Claims, 4 Drawing Sheets

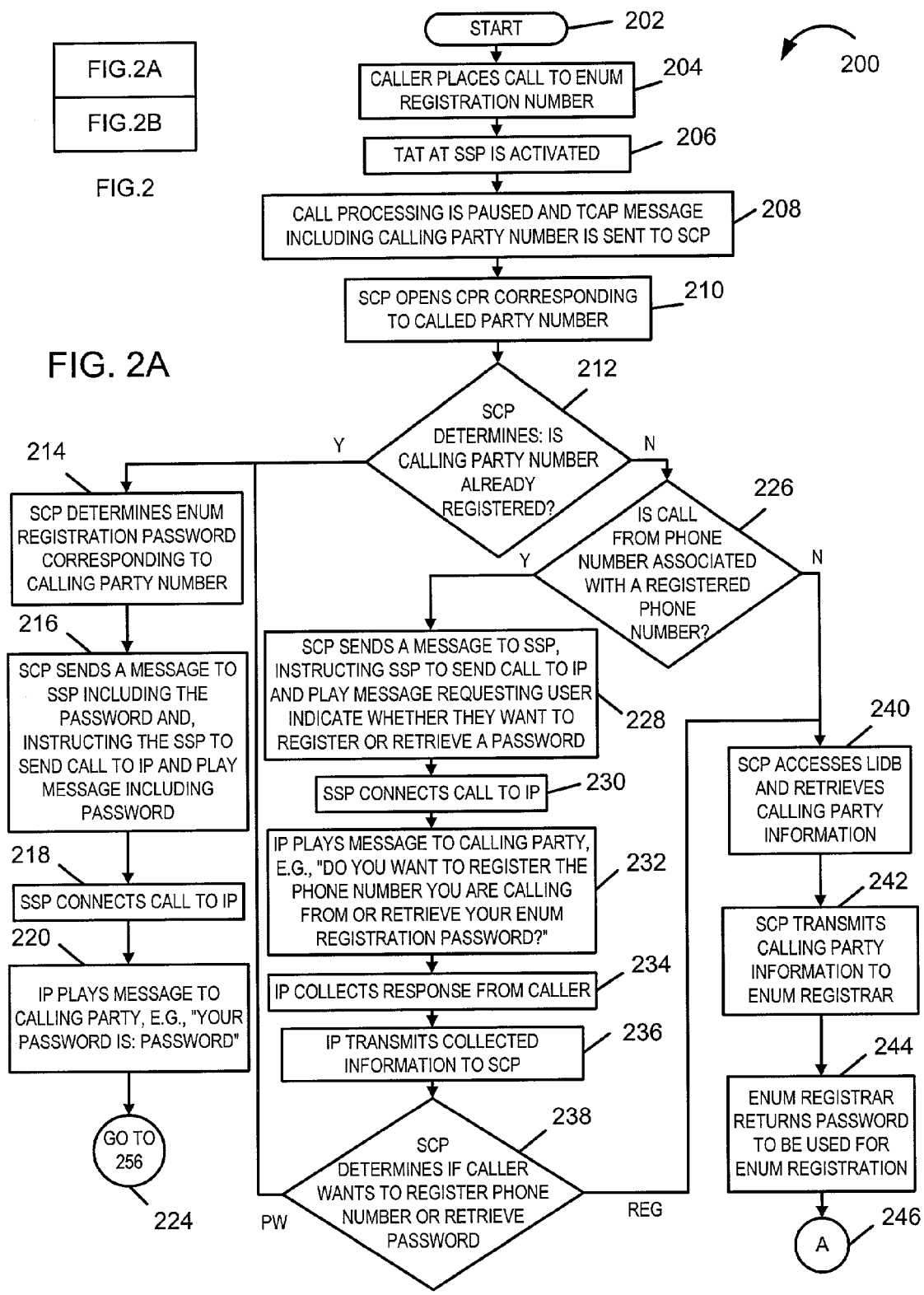

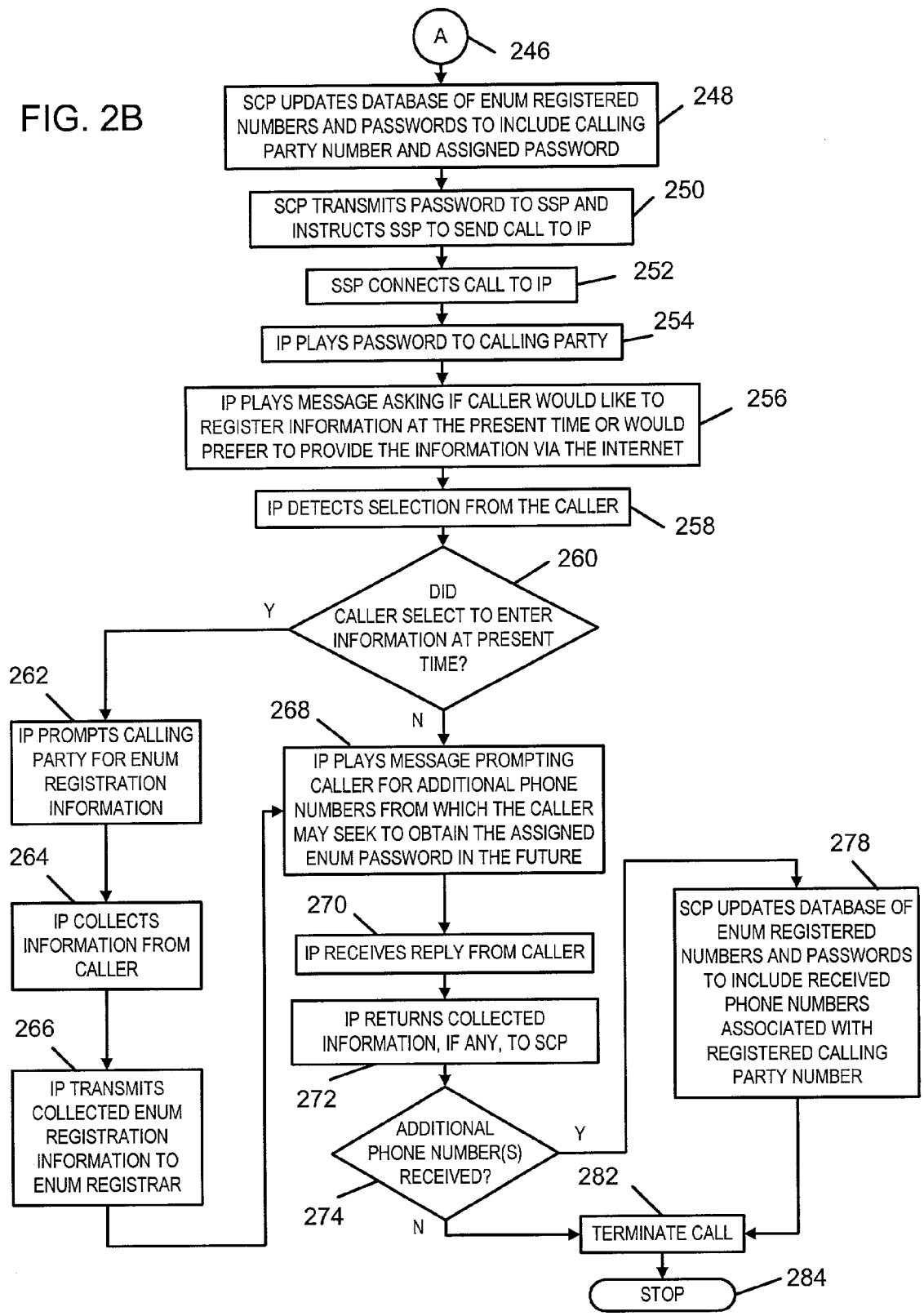

METHODS AND APPARATUS FOR AUTHENTICATING AND AUTHORIZING ENUM REGISTRANTS

FIELD OF THE INVENTION

The present invention is directed to communications systems and, more particularly, to methods and apparatus for authenticating and authorizing people who are registering with a service, e.g., an ENUM registration service.

BACKGROUND OF THE INVENTION

Telephone service is an important part of our society. For example, telephones allow us to talk to people miles away. Picking up a telephone and entering the digits corresponding to the person to whom you want to talk, has become second nature. Even though people using a telephone may not have noticed it, the techniques used to transmit conversations from telephone to telephone have changed over the years. As advancements in technology provide improved techniques for making phone calls, the telephone companies have upgraded their systems.

Now that technology has advanced once again, telephone networks are beginning to move from the public switched telephone network (PSTN) to an IP (Internet Protocol) based telephone network. Therefore, as in any switch from one network to another, moving to an Internet based network raises new challenges. For example how to offer Internet services such as Voice over Internet Protocol (VoIP) based telephone service. From a customer acceptance perspective it is important not to change the way phone calls are made, since the way telephones are used have become so commonplace. Therefore, there needs to be techniques for locating called party telephones on the Internet using just the telephone number entered by a VoIP user. One approach to address these problems is ENUM.

"ENUM" is the name of the protocol that converges the international standard for telephone numbering sanctioned by the International Telecommunication Union (ITU), i.e., E.164, with Internet networks by using a technique based on the Domain Name System (DNS) of the Internet. ENUM is described in Internet Engineering Task Force (IETF) document RFC 2916, which is the approved protocol document that discusses the use of DNS for the storage of telephone numbers and the available services connected to a telephone number.

Using E.164 numbers and the DNS to implement ENUM is appropriate because E.164 is an accepted standard that is used throughout the world for telephone numbers, and the DNS includes the ability to correlate alphanumeric information with IP addresses. Currently, DNS is used to correlate webpage addresses with their corresponding Internet Protocol (IP) addresses, i.e., the DNS allows user computers to find website servers over the Internet using easy to remember website addresses instead of complicated Internet addresses. E.164 numbers like website names remain relatively static requiring relatively infrequent updates, e.g., as individual service subscribers change their telephone or Internet services.

A fully qualified E.114 number will now be described. An E.164 number includes a country code, an area or city code and a phone number. The ITU issues country codes to sovereign nations, e.g., the United States has a country code of "1". Area or city codes, and phone numbers are administered by the sovereign nations through local telecommunications regulatory agencies. For example, a fully qualified E.164 number for the phone number, 555-1234, in Washington, D.C. (area code 202) in the United States would be +1-202-555-1234. The "+" indicates the number is a fully qualified E.164 number.

ENUM addresses the challenges discussed above regarding VoIP service and other services, while providing telephone customers with many benefits. ENUM enables companies to offer a wide range of IP-based services for communicating with another person when the user knows only a telephone number or has access to only a telephone keypad. The user is allowed to access these IP-based services and resources from Internet-aware telephones, ordinary telephones connected to Internet gateways or proxy services, and/or other devices coupled to the Internet where input is limited to numeric digits. ENUM enables users to specify their preferences for receiving incoming communications, and gives greater user control over communications. For example, a user can set up voice mail preferences or can input a destination phone number in a call forwarding service.

There are many potential applications of ENUM. However, the principal applications for ENUM have centered on two areas. First is Voice over IP (VoIP) and second is Voice Protocol for Internet Mail (VPIM). One goal of the VoIP industry is to make a phone call over the Internet as easy to make as a regular PSTN phone call and with the same level of quality. If an average telephone customer were to make a telephone call using, e.g., an Internet-enabled phone to another Internet-enabled phone, all of the steps in between should remain transparent to the user. To the calling party and the called party, this phone call should appear the same as a call made over the PSTN.

One goal of the VPIM industry is to develop a comprehensive mechanism by which voice mail systems can exchange messages over IP networks. ENUM enables carrier and enterprise voicemail systems to find each other, interoperate, and exchange messages. Although VoIP and VPIM are the most widely discussed applications, other application possibilities for ENUM, including but not limited to Internet Fax and Instant Messaging, exist.

Since ENUM can offer many different kinds of services, ENUM has a wide range of potential customers including individual residential telephone customers, corporations, government agencies, military, and hosts of other non-individual users. When a subscriber wishes to use a specific service, they can identify the ENUM service that they wish to use, e.g., by entering a code on the telephone keypad. A list of the services that a user is subscribed to is stored in the ENUM database and may be accessed in response to entry of the code.

The ENUM protocol works in the following manner. Once a telephone number is entered, it is translated into an Internet address using the following steps:

1) The phone number is translated into a fully qualified E.164 number by adding the city (or area) and country code. For example: 555-1234 dialed in Washington D.C. becomes +1-202-555-1234, where the "1" represents the North American country code, "202" represents the city or area code for Washington D.C. and the "+" indicates that the number is a fully qualified E.164 number.

2) All characters are removed except for the digits. For example: +1-202-555-1234 becomes 12025551234

3) The order of the digits is reversed. For example: 12025551234 becomes 43215552021

4) Dots are placed between each digit. For example: 43215552021 becomes 4.3.2.1.5.5.5.2.0.2.1

5) The domain "e164.arpa" is appended to the end. For example: 4.3.2.1.5.5.5.2.0.2.1 becomes 4.3.2.1.5.5.5.2.0.2.1.e164.arpa.

ENUM then issues a DNS query on this domain. Once the authoritative name server is found, ENUM retrieves relevant NAPTR Resource records from an ENUM database and will perform according to the user's registered services for that number.

Customer information, e.g., the types of services a customer is registered for, is stored in the ENUM database. When including new customer information into an ENUM database, many logistical issues concerning the protection of both a telephone company and its customers from fraudulent attacks arise. Telephone number assignees must opt-in, e.g., register, with an ENUM registrar before their telephone number is included in an ENUM database. If appropriate precautions are not taken, a telephone company and its customers may be exposed to fraudulent activities resulting from inaccurate, unauthorized and/or unauthenticated ENUM records (e.g., email address and SIP address) being associated with a telephone number. For example, "telephone number hijacking" may occur. Telephone number hijacking refers to a scenario where an ENUM record is created or modified under false pretences. It can effect a customer's ability to receive incoming calls or messages when the ENUM process is invoked. In addition, if adequate security is not provided prior to registration of information in ENUM, an ENUM record may be created by a user who is not authorized to create an ENUM record for that telephone number resulting in inaccurate and/or possibly misleading information being provided to ENUM users. Given the problems that can arise from inaccurate ENUM records, it is important that individuals seeking to register ENUM information are adequately authenticated and authorized.

One known method for authenticating a registrant is asking for a copy of personal material that would normally be accessible only by the registrant, e.g., a driver's license or a recent telephone bill. Unfortunately, this technique creates a long registration process, whereby a registrant has to wait until the registrar receives the personal material before they can register and use the new service. In the fast paced business world, an extended registration time could lead to a loss of money, and is not acceptable. In addition, when using copies of identification there is risk of someone fraudulently obtaining the information.

A second technique for authentication and authorization may include the registrar calling the registrant's telephone number. If the registrant answers the phone, it may be assumed that the registrant has the authority to use the phone line. Unfortunately, this technique introduces a second phone call that ties up the registrar's resources and increases the costs, e.g., the telephone bill, of the registrar.

Further, another technique for authorizing a registrant that was suggested included using caller ID information. Although such a technique was suggested a workable method for using caller ID information to authenticate and authorize registrants was not developed.

Accordingly, there is a need to properly authenticate ENUM registrants, e.g., there is a need for a mechanism to ensure that the ENUM registrants are who they say they are. In addition, there is a need to ensure that ENUM registration requests are properly authorized, i.e., there should be a mechanism to ensure that the ENUM registrant is entitled to use the telephone number the registrant is seeking to register.

SUMMARY OF THE INVENTION

The present invention is directed to methods and apparatus for authenticating and/or authorizing a party, e.g., caller, e.g., to receive and/or access a service such as an ENUM registration service.

In accordance with the present invention a line information database (LIDB) is accessed using calling party information, e.g., telephone number information, automatically included in a call. Such caller identification information, e.g., call party number information, is added by the telephone switch in the PSTN and is therefore generally reliable. Line information databases (LIDB) are well known databases used for maintaining customer information corresponding to a telephone number. Such databases are maintained by various telephone companies. The contents of a LIDB are generated by a telephone company, e.g., when a telephone number is assigned to a service subscriber. Furthermore, while LIDB information is often used to supply a calling party's name, e.g., as part of a caller ID service, the contents of a LIDB cannot be directly edited by individual service subscribers. This makes a LIDB a reasonably reliable source of information about a party corresponding to a particular phone number.

By using a calling party number received as part of a telephone call to a telephone registration service, and accessing LIDB using the calling party number, reliable information about a calling party can be recovered. The returned LIDB information provides a means to verify that a telephone number, which a user is seeking to register in ENUM does, in fact, belong to the user.

As opposed to other authorization mechanisms, LIDB, as an authorization mechanism, imposes only a minimal administrative burden on parties. Because the ENUM registrant would have to call from the telephone number that the registrant wished to register in ENUM, the invention performs a form of authentication also.

Advanced Intelligent Network techniques, including the use of a service control point, can be used to accomplish this. In one exemplary embodiment, an ENUM registrant dials a specific telephone number, e.g., a telephone number corresponding to an ENUM registration service, from their home or office telephone number they wish to register. The dialed telephone number is provisioned with a trigger, e.g., an AIN Terminating Attempt Trigger (TAT). The call is paused in response to activation of the trigger and a query is launched to the SCP, which may be an integrated service control point (ISCP). The SCP opens a Call Processing Record (CPR) corresponding to the called number. CPR logic then utilizes SCP Send/Get Data Function to poll a LIDB to retrieve customer identification information corresponding to the calling party. The LIDB supplies the ENUM registrant's LIDB record (Telephone number, name, address, etc.) to the SCP.

The SCP then again uses its send Get Data Function capability to connect up to the ENUM registrar and transmit the user's data to the ENUM registrar. The ENUM registrar transmits back to the SCP a password which can be used by the party seeking to register the calling telephone number when providing ENUM registration information and/or update information to be stored in the ENUM database, e.g., via the Internet.

In accordance with one feature of the present invention, the assigned ENUM registration password is stored in a database along with the registered telephone number. In the event the party who registered the telephone number with ENUM forgets their registration password they can call the registration service telephone number from the registered phone and obtain their password. In such an embodiment, calling party number information automatically included in the call to the registration service telephone number is used to access a database including the assigned password and retrieve there from the registration password corresponding to the calling party telephone number. The password may be supplied to the calling party using a peripheral device's text to speech and message playing capabilities.

In some embodiments, the registered party is allowed to associate one or more non-registered telephone numbers with an ENUM registered telephone number. The associated telephone numbers are stored in a database along with the corresponding registered telephone number and registration password. A party with an ENUM registered phone number can obtain the ENUM registration password, following the initial assignment of the password, by calling the registration number from a telephone number associated with the registered telephone number. Calling party number identification information is used to access and retrieve the password as in the case where the call seeking the password is made from a phone corresponding to the registered telephone number.

As part of the initial ENUM registration process, registration information can be collected by a telephone switch peripheral device, e.g., using speech recognition and/or digit collection capabilities, in an automated manner. This information can then be conveyed to the ENUM registration information service by the peripheral device. Such an approach eliminates the need for a party seeking to register a telephone number in the ENUM database to contact the ENUM registrar, e.g., via the Internet, after making the initial registration call to the ENUM registration service telephone number.

ENUM registration passwords may be modified by contacting the ENUM registration service via the Internet after the initial password assignment process. In such a case, the ENUM registration service updates the password information in the AIN accessible database so that password changes made directly at the ENUM registrar via the Internet will be reflected in the passwords supplied to a party seeking to obtain the ENUM registration password by calling the registration service from a registered telephone.

Various additional features and advantages of the present invention will be apparent from the detailed description which follows.

BRIEF DESCRIPTION OF THE DRAWINGS

FIG. 2 is a flow diagram illustrating the steps of an exemplary method of the present invention for authenticating and authorizing an ENUM registrant.

DETAILED DESCRIPTION

Figure 1:
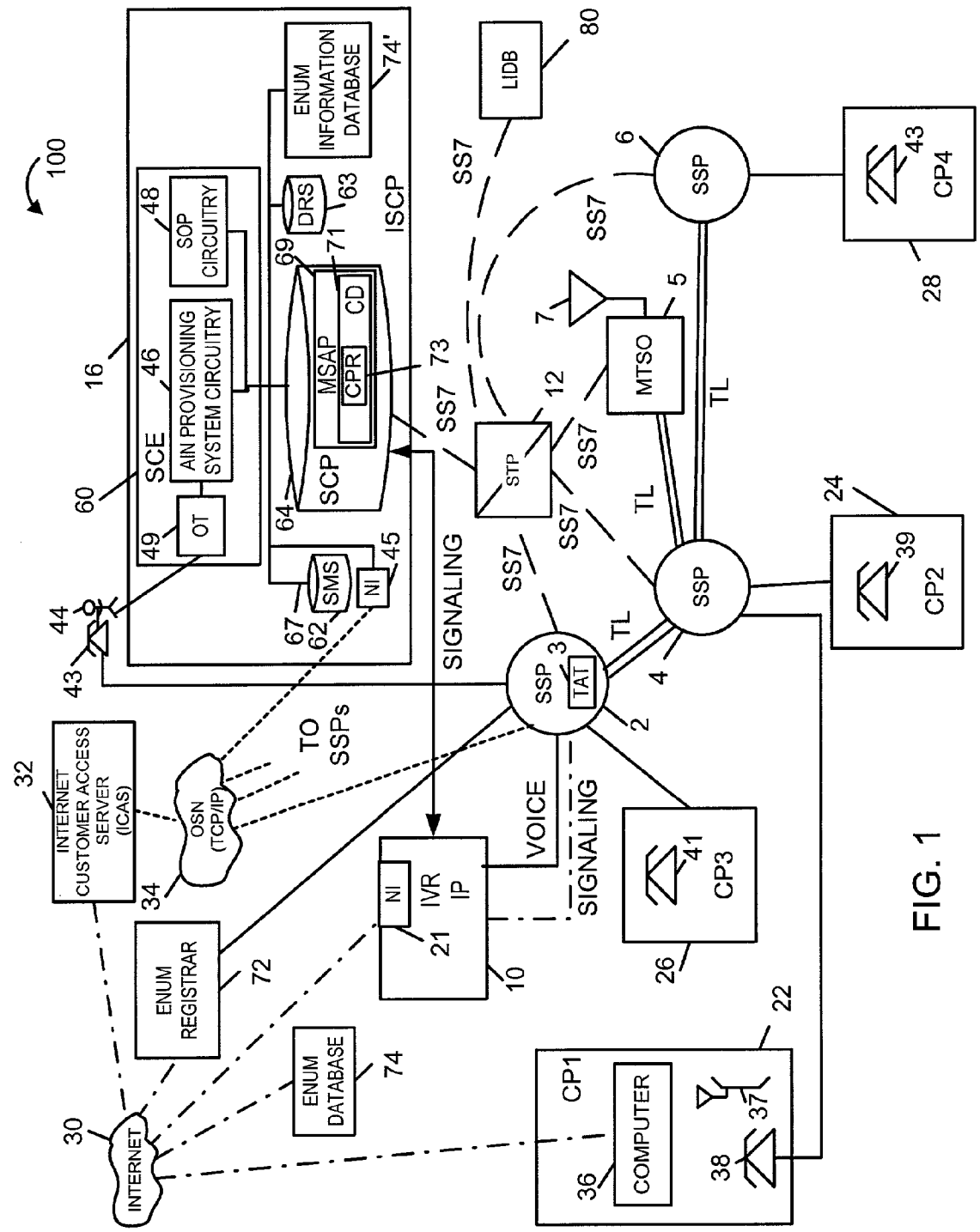
FIG. 1 illustrates a communication system implemented in accordance with an exemplary embodiment of the present invention.

FIG. 1 illustrates a communication system 100 implemented in accordance with an exemplary embodiment of the present invention. The system 100 includes routines, call processing logic and hardware for providing the communications service, e.g., registration verification service, of the present invention. The system 100 supports communications via the Internet 30, as well as the public switched telephone network (PSTN). The PSTN includes a plurality of signal switching points (SSPs) 2, 4, 6 which, as is known in the art, may be implemented using known Class 4 and/or Class 5 telecommunications switches, e.g., telephone switches, capable of supporting the signaling system 7 (SS7) protocol. Each SSP 2, 4, 6 may correspond to a different telephone central office. Trunk lines (TLs), which may comprise, e.g., one or more T1 lines, interconnect the various SSPs 2, 4, 6. In addition to SSPs 2, 4, 6, the system 100 includes a mobile telephone switching office (MTSO) 5 for servicing mobile telephone calls. The calls may be received via antenna 7. The MTSO 5 is coupled to one or more SSPs, e.g., SSP 4 via trunk lines. In this manner, cellular telephone calls can be routed and processed via an SSP 4 allowing interaction with land line telephones as is known in the art.

Each SSP 2, 4, 6 is normally connected to one or more customer premises (CP) which may include, e.g., residences and/or offices. In the FIG. 1 example, first and second customer premises 22 and 24 are coupled to the second SSP 4, third customer premises 26 is coupled to the first SSP 2 while the fourth customer premises 28 is coupled to SSP 6. Connections between the SSPs and CPs may be by POTS lines, ISDN lines, DSL, or other known communications lines.

Communications equipment, referred to as customer premise equipment (CPE) is located at each customer premises 22, 24, 26, 28. Customer premise equipment may include, e.g., telephones, faxes, computers, etc. In FIG. 1, a computer 36, land-line telephone 38, and mobile telephone 37 are shown as being located at the first customer premises 22. Since cell phone 37 is a mobile communications device it need not be physically located at the first customer premises to operate. The computer 36, located at the first customer premises 22 is coupled by any one of a plurality of known connection techniques, e.g., telephone dial-up, ISDN, DSL, etc., to the Internet 30, also known as the World Wide Web.

While the second, third and fourth customer premises 24, 26, 28 are illustrated as including only landline phones, it is to be understood that they may have any number of communications devices including, e.g., telephones, faxes, and computer devices. Additional telephone service subscribers may be coupled to any one of the SSPs 2, 4, 6.

The system 100 is implemented using advanced intelligent network (AIN) techniques. Accordingly, the processing of calls directed to a customer's telephone line and/or received by an SSP from a telephone customer's line may be controlled by instructions included in customer call processing records (CPRs). In the system 100, the CPRs are stored at an Integrated Services Control Point (ISCP) 16. The CPRs may include sequential contingent call processing instructions in the form of a next event list (NEL). At least one CPR exists for each subscriber to an AIN based service. A customer's CPR is accessed in response to activation of an AIN trigger set at, e.g., the SSP 2, 4, or 6 to which the subscriber's line or lines are connected, e.g., by POTS lines.

The ISCP 16 includes a network interface (NI) 45, a service management system (SMS) 62, a data and reporting system (DRS) 63, a service creation environment (SCE) 60, an SCP 64 and an ENUM information database 74'. A local network 67 couples the various components of the ISCP 16 together.

The network interface 45 couples the ISCP 16 to various other components of the telephone network 100 via a TCP/IP based network referred to as an operational services network (OSN) 34. The OSN 34 interconnects SSPs 2, 4, 6, intelligent peripheral device 10 and the ISCP 16. Thus, the OSN 34 is a network over which control and signaling information can be passed between the various system components, e.g., using TCP/IP. In addition to being connected to the OSN 34, ISCP 16 is connected, via its SCP 64, to the SSPs and MTSO via one or more signal transfer points (STPs) 12 and Signaling System Seven (SS7) interconnects over which messages, data, and requests for call processing control instructions can be communicated between the SSPs 2, 4, 6, or MTSO 5 and ISCP 16 in accordance with the SS7 protocol.

The SCP 64 includes a multi-service application platform (MSAP) database 69, which includes customer data (CD) 71 for each of a plurality of other service subscribers. The customer data 71 may include, for each customer: 1) a list of the services to which the customer subscribes; 2) a password which may be input via DTMF signals; and/or 3) a call processing record (CPR) 73 which is used to instruct an SSP on how to process a call in response to one or more AIN triggers to thereby implement the services to which the customer subscribes. The ISCP 16 supports several telephone services, e.g., an ENUM registration verification service, a call forwarding service and a call screening service.

The customer data 71 which includes one or more call processing records 73 is generated, at least initially, by the SCE 60 in response to input received from a service representative or operator 44. Customer data in the database 71 and the CPR 73 may, after initial provisioning of a service for a customer, be updated by the customer via telephone or via the Internet through the use of a Web browser.

The SCE 60 includes an operator terminal (OT) 49, service order processing circuitry 48 and AIN provisioning system circuitry 46. The operator terminal 49 is used by the service representative 44 to enter service information, e.g., to create a service account for a new subscriber. The entered data may be information, e.g., relating to the addition of a new customer, the adding of a service for an existing customer, and/or the cancellation of a service being provided to an existing customer. The service order processing circuitry 48 is used to generate service orders, e.g., orders to add or cancel a service, in response to service information entered into the operator terminal 49. The AIN provisioning system circuitry 46 is responsible for setting and/or updating AIN triggers at the various signal switching points (SSPs) required to implement a service order generated by the service order processing circuitry 48. In addition to setting AIN triggers, the AIN provisioning system circuitry 46 is responsible for generating and/or updating customer data, e.g., call processing records 73 and other information stored in various locations in the system 100, as required to implement a service order.

As will be discussed below, an intelligent peripheral device 10 is used to provide services to telephone service subscribers. Thus, in addition to updating information in the customer database 71, the AIN provisioning system circuitry is responsible for updating information in peripheral device 10 as required. The updating of the peripheral devices and the setting of AIN triggers can be performed by the AIN provisioning system circuitry 4G through communications with the various system components conducted using the OSN 34 and/or via SS7 links.

Figure 3:
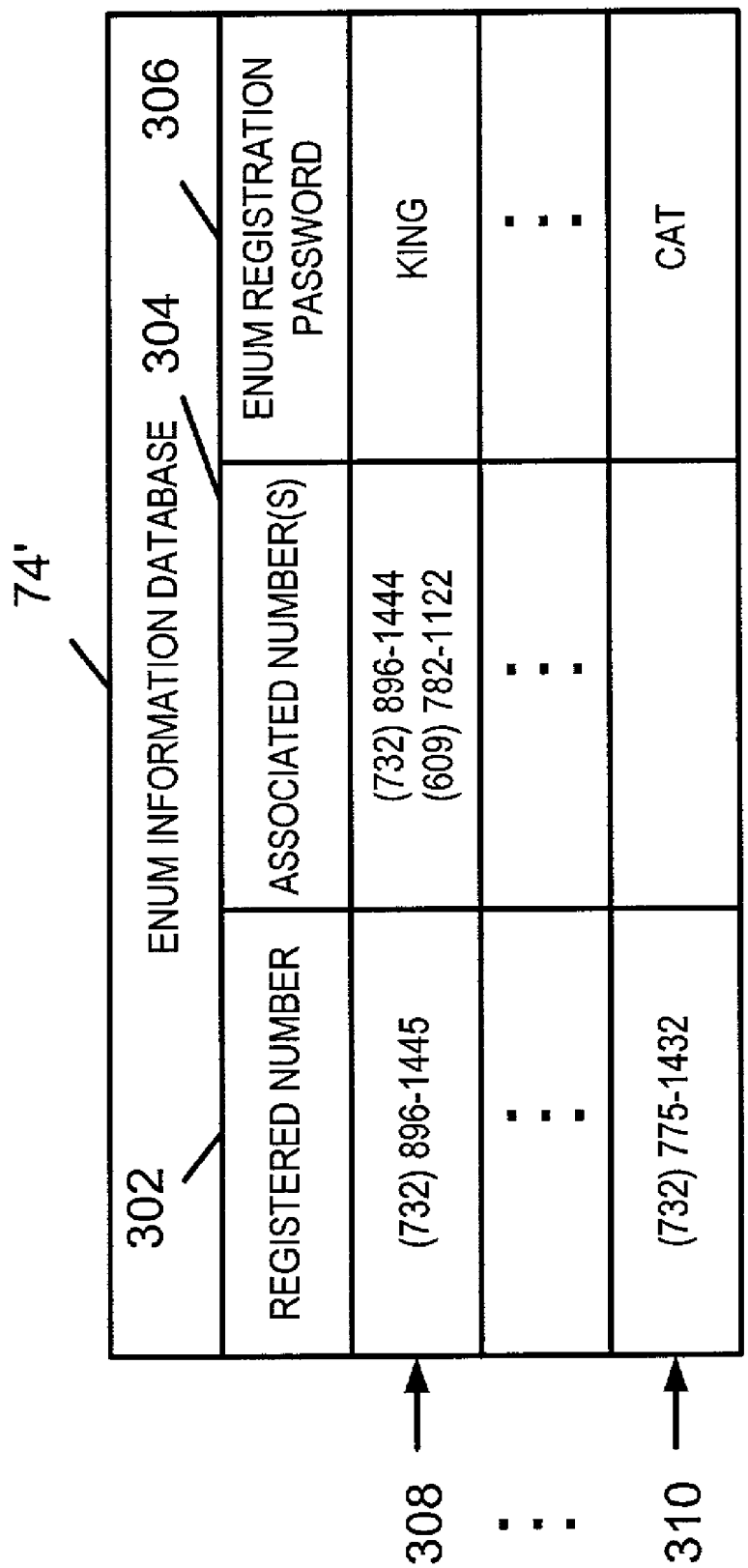
FIG. 3 illustrates an exemplary ENUM database implemented in accordance with the invention.

ISCP 16 also includes an ENUM information database 74'. In the exemplary embodiment, this database stores registered ENUM phone numbers, any phone numbers associated with a registered phone number and ENUM registration passwords. An exemplary ENUM information database 74' is illustrated in FIG. 3. The ENUM information database may also be included in SCP 64. As part of an authentication process, the SCP 64 accesses the ENUM information database 74' to authenticate ENUM registrants calling to obtain their password.

ENUM registrar 72 is coupled to SSP2 and is also coupled to the Internet 30. Subscribers wishing to register their phone numbers with the ENUM database 74, and wishing to subscribe to services, can call ENUM registrar 72 to input their information. The ENUM registrar receives subscriber information, e.g., information collected by a telephone switch peripheral device 10 and/or information provided by the subscriber after being authenticated in accordance with the invention. The ENUM registrar updates the ENUM database 74. The ENUM registrar 72 includes telephone lines for receiving calls from subscribers, and a website for receiving additional information from subscribers and/or for account maintenance. In accordance with the invention, registrar telephone lines used for initial ENUM registration may have terminating attempt triggers (TATs) set on them at SSP 2. In this manner calls to the ENUM registrar can be detected at SSP 2 and subject to AIN processing prior to the registrar receiving ENUM registration information from a calling subscriber. This allows AIN processing to be used to perform caller authentication and/or to automate the collection of ENUM registration information in accordance with the invention.

The system 100 includes an Internet Customer Access Server (ICAS) 32. The server 32 is used as a secure gateway via which service subscribers can update and configure their telephone service information using a computer coupled to the Internet. The ICAS 32 includes security routines, e.g., a firewall, designed to prevent individuals other than the subscriber gaining access to and/or modifying via the Internet, subscriber service information. The ICAS 32 is coupled to the OSN 34 thereby allowing a customer, upon satisfying various security checks, to access and modify service information stored in any one of the various network devices, e.g. ISCP 16, and/or peripheral device 10, coupled to the OSN 34.

In order to implement all or portions of various services, including the ENUM authentication and registration service of the invention, intelligent peripheral devices such as peripheral device 10 are used. The peripheral device 10 is an interactive voice response (IVR) peripheral device which is capable of, and includes circuitry for, performing speech recognition and/or DTMF signal detection operations as well as playing voice prompts and other messages to a telephone service subscriber. Peripheral device 10 can be used to prompt a caller for information, to collect information provided by the caller and to provide said information to another device or system element such as the service control point 60 and ENUM registrar 72.

IVR peripheral device 10 is coupled to the first SSP 2 via audio (voice) and signaling lines. It is also coupled to the OSN 34 and the Internet 30 through a network interface (NI) 21. The IVR peripheral device 10 may be implemented using known hardware and includes circuitry and/or software for implementing steps of the present invention.

System 100 also includes line information database (LIDB) 80 coupled to STP 12 via an SS7 link. The LIBD 80 includes telephone customer information, e.g., name, telephone number and address, which may be used by several telephone services including caller ID and the ENUM verification and registration service of the invention.

The present invention allows users to register telephone numbers with ENUM and to retrieve their password used when registering and/or updating ENUM registration information via a telephone call. Registration passwords are provided to a caller seeking to register a phone number for the first time or a caller who is seeking to obtain the ENUM password, e.g., because he/she forgot it. ENUM passwords may be retrieved from a registered phone number or a phone number associated with a registered phone number. Once a phone number is registered, in one embodiment, it can no longer be used as an associated phone number. In such embodiments, calls from registered phone numbers can be used to obtain the password associated with the phone number from which the call is placed but not another phone.

In accordance with one feature of the invention, when an ENUM registrant registers a phone number, they are given a chance to input alternate phone numbers that the registrant may be calling from to access ENUM password information. This allows an ENUM registered service subscriber to retrieve an ENUM registration password from a call placed from the registered phone number or an associated phone number. The password can then be used to update ENUM registration information for the registered phone number directly with the ENUM registrar 72, e.g., via the Internet.

An exemplary ENUM database will now be described with reference to FIG. 3. FIG. 3 illustrates an exemplary ENUM database 74' that can be accessed and updated by SCP 64 in accordance with the invention. Each row 308 through 310 in the database 74' corresponds to a different telephone number that is registered, or authorized to be registered, with ENUM. The database 74' includes a column of registered numbers 302, numbers associated with the registered number 304, and the password associated with the registered number 306. Rows 308 to 310 illustrate exemplary ENUM registrant information. Row 308 includes "(732)896-1445" as a registered number. The registered number has two associated numbers and the password for the registered number is "KING". The registered number of row 310 is "(732)775-1432". This number has no associated numbers, and the password for the row 310 registrant is "CAT".

FIG. 2, which comprises the combination of FIG. 2A and FIG. 2B, illustrates the steps of an exemplary method 200 executed by the system 100 for authenticating and authorizing ENUM registrants as well as collecting information from registrants. Method 200 will be described with reference to the system 100 of FIG. 1.

The method 200 starts in step 202 of FIG. 2A, with a Terminating Attempt Trigger (TAT) 3 being set at the SSP that services the ENUM registrar 72, e.g., SSP 2. In step 204 a caller places a call to the ENUM registrar 72 by dialing a phone number created for registering your phone number in an ENUM database and for subscribing to services. Then, the method 200 proceeds to step 206, where the call to the ENUM registration number activates the TAT 3 set at SSP 2. In step 208 call processing is paused and a message, e.g., a TCAP message, which includes the calling party number, is sent to the SCP 64 for instructions on how to proceed with the call. The method 200 proceeds from step 208 to step 210.

In step 210, the SCP 64 opens the CPR 73 corresponding to the called party number, e.g., the CPR corresponding to the ENUM registration service. Under control of instructions in the accessed CPR, in decision step 212 the SCP 64 determines if the calling party number is already an ENUM registered number. The SCP 64 can check the status of the calling party number by accessing an ENUM information database 74' which includes information on previously registered numbers, associated telephone umbers and passwords to be used when updating or providing ENUM registration information. If, in step 212, the SCP 64 determines the calling party number is a registered number, the method 200 proceeds along a path beginning with step 214. However, if the SCP 64 determines the calling party number is not a registered number, the method 200 proceeds along another processing path beginning with decision step 226.

In step 226, the SCP 64 determines if the calling party number is associated with a registered phone number, e.g., using the information in database 74'. If the calling party number is not associated with a registered number, the method 200 proceeds directly to step 240, but if the calling party number is associated with a registered number, the method 200 proceeds to step 228.

In step 228, the SCP 64 sends a message to the SSP 2, instructing the SSP 2 to send the call to the peripheral device 10 and for the peripheral device 10 to play a message to the caller, e.g., a message requesting the caller indicate whether they want to register the current number or retrieve a password. Then, in step 230 the SSP 2 connects the call to the peripheral device 10. In step 232, the peripheral device 10 plays a message to the calling party, e.g., "Do you want to register the phone number you are calling from or retrieve your ENUM registration password?" In step 234 the peripheral device 10 collects the response from the caller, and in step 236 the peripheral device 10 transmits the collected information to the SCP 64. The method 200 proceeds from step 236 to decision step 238.

In decision step 238, the SCP 64 determines, from the received message, if the caller wants to register a phone number or retrieve a password. If the caller wishes to register a phone number, e.g., the calling party number, method 200 proceeds to step 240. On the other hand if the caller wishes to retrieve a password, method 200 proceeds to step 214.

In step 214, which may have been reached from step 212 or from step 238, the SCP 64 determines the ENUM registration password corresponding to the calling party number, e.g., by accessing the ENUM information database 74'. Then, in step 216, the SCP 64 sends a message to the SSP 2 including the retrieved password and instructing the SSP 2 to send the call to the peripheral device 10, and to have the peripheral device 10 play a message to the caller which includes the retrieved password. In step 218 the SSP 2 connects the call to the peripheral device 10. Then, in step 220, the peripheral device 10 plays a message to the calling party, e.g., "Your password is: PASSWORD", where PASSWORD is the password corresponding to the calling party number, e.g., because it is a registered number or is associated with a registered number. Operation proceeds from step 220 to step 256 via connecting node 224. This allows the caller to provide updated registration information over the phone, if the caller so desires.

If a call is made from an unregistered, unassociated phone to the registration number or is made from an associated phone number that a caller seeks to register, processing will encounter the registration path beginning with step 240.

In step 240, which may have been reached from step 226 or step 238, the SCP 64 accesses a line information database (LIDB) 80, and retrieves information corresponding to the calling party number. This information may include a customer name and an address. If calling party information is not found on one telephone company's LIDB 80, the SCP 64 may access the LIDBs of other telephone companies to search for the calling party number. LIBD 80 information is relatively accurate and secure since it is maintained by the telephone companies and cannot be directly modified by telephone service subscribers. The method 200 proceeds from step 240 to step 242.

In step 242, the SCP 64 transmits the calling party information, e.g., name and address, obtained from the LIDB 80 to the ENUM registrar 72. In this manner the ENUM registrar 72 is provided with calling party identification information, e.g., name and phone number, which is relatively reliable. Then, in step 244, the ENUM registrar 72 returns a password to be used for ENUM registration. Operation proceeds from step 244 to step 248, through connection node 246.

In step 248 of FIG. 2B, the SCP 64 updates the ENUM information database 74' to include the calling party number as a registered number and the password obtained from the ENUM registrar 72. In addition, if the calling party number is an associated number to any other registered number, then it is removed from the associated number column 304, i.e., it ceases to be an associated telephone number as a result of the registration process. Next, in step 250, the SCP 64 transmits the password to the SSP 2 and instructs the SSP 2 to send the call to the IP 10 and play a message including the password. In step 252 the SSP 2 connects the call to the peripheral device 10. Next, in step 254, the peripheral device 10 plays the ENUM registration password to the calling party. Then, the method 200 proceeds from step 254 to step 256.

In step 256, which may be reached from step 254 or from step 220, the peripheral device 10 plays a message asking the caller if they would like to input ENUM registration information, e.g. NAPTR records, at the present time, or if they would prefer to provide the information directly to the ENUM registrar 72 via the Internet. In step 258, the peripheral device 10 detects the selection from the caller. Then, the method 200 proceeds to decision step 260.

At decision step 260, if the caller does not wish to provide information at the present time, operation proceeds directly to step 268. On the other hand, if the caller wishes to provide information at the present time, the method proceeds to step 262. In step 262, the peripheral device 10 prompts the calling party for ENUM registration information. In step 264, the peripheral device 10 collects the information from the caller, which may be in the form of speech or DTMF tones. Speech and/or DTMF tones are converted into alphanumeric values, e.g., text and/or numbers by the peripheral device 10. Then, in step 266, the peripheral device 10 transmits the collected ENUM registration information to the ENUM registrar 72 which can use the information to update the ENUM database 74 used by the DNS.

As an alternative to the peripheral device 10 collecting the ENUM registration information, after password assignment, users may be connected directly to the ENUM registrar 72. In such implementations, the ENUM registrar 72 collects ENUM registration information from the caller. The information collection at the ENUM registrar 72 may be performed by a live operator and/or by a computer. The ENUM registrar 72 updates the ENUM database 74 with any collected information, e.g., NAPTR records, received.

The method 200 proceeds from step 266 to step 268. In step 268, which may have been reached from step 260 or step 266, the peripheral device 10 plays a message to the caller promoting the caller for any additional phone numbers from which the caller may seek to obtain their assigned ENUM password in the future. Then, in step 270, the peripheral device 10 receives a reply from the caller. In step 272 the peripheral device 10 returns a message to the SCP 64 that includes any collected information. Then, the method 200 proceeds from step 272 to decision step 274.

In step 274 the SCP 64 determines, from the received information, if any additional phone numbers where received. If no phone numbers are received, processing proceeds to step 282 where the call is allowed to terminate in a normal manner. If additional phone numbers were provided by the caller, the method 200 proceeds to step 278, where the SCP 64 updates the ENUM information database 74' to include the received phone numbers, e.g., as phone numbers associated with the registered calling party number. Then the method 200 proceeds to step 282, where the call is allowed to terminate in a normal manner. The method 200 stops in step 284 following termination of the call to the registration number. While processing of the received call stops in step 284, the TAT 3, at SSP 2, remains active waiting for another call to the ENUM registrar 72.

While described in the context of an ENUM registrar service the caller verification and registration techniques may be used with a wide variety of devices where it may be desirable to make assignment of a password dependant on a party calling from a specific phone number as a security measure.

Numerous variations on the above described methods and apparatus are possible without departing from the scope of the invention.

What is claimed is:

1. A service method, comprising the steps of:
    operating a telephone switch to detect a call including a calling party number directed to a telephone number corresponding to a service provider;
    retrieving from a database of telephone service subscriber information, information corresponding to said calling party number;
    supplying at least some of the retrieved telephone service subscriber information to said service provider; and
    operating a telephone network element to provide the calling party with a password to be used when obtaining access to a service provided by said service provider wherein the service requires use of said calling party number.

2. The method of claim 1, further comprising the step of:
    receiving said password from said service provider prior to providing the calling party with said password.

3. The method of claim 1,
    wherein said database of telephone service subscriber information is a line information database; and
    wherein said step of retrieving includes:
        i. transmitting a message to a service control point including the calling party number; and
        ii. operating the service control point to retrieve said calling party information from the line information database.

4. The method of claim 3,
    wherein said step of supplying at least some of the retrieved telephone service subscriber information to said service provider includes operating the service control point to send said at least some information to said service provider.

5. The method of claim 4, further comprising the step of:
    operating the service control point to receive said password from said service provider prior to providing the calling party with said password.

6. The method of claim 5, further comprising the step of:
    operating a telephone switch peripheral device to collect service registration information from said calling party; and
    operating said telephone switch peripheral device to transmit at least some of said collected information to said service provider.

7. The method of claim 1, further comprising:
storing said password and said calling party number in a database.

8. The method of claim 7, further comprising the step of:
retrieving, using calling party number information included in a second call directed to said service provider from said calling party number, said password corresponding to the calling party number from said database.

9. The method of claim 8, further comprising:
supplying the retrieved password to the calling party.

10. The method of claim 7, further comprising:
receiving from said calling party a telephone number to be associated with said calling party number; and
storing said password and said associated telephone number in a database.

11. The method of claim 10, further comprising the step of:
retrieving, using calling party number information included in a second call directed to said service provider from said associated telephone number, said password from said database.

12. The method of claim 7, further comprising the step of:
updating said stored password to a new password when said password is modified by said service provider in response to information received from a party providing said stored password and said calling party number via the Internet to said service provider.

13. The method of claim 1, wherein said service provider is an ENUM registrar responsible for registering information in an ENUM database.

14. A system for providing a service, comprising:
a telephone switch having a trigger set on a telephone line corresponding to a service provider to detect calls to said service provider;
a service control point coupled to said telephone switch including control logic for retrieving telephone service subscriber information corresponding to a calling party number included in a call which activates said trigger from a line information database and for causing said service control point to supply at least some of the retrieved telephone service subscriber information to said service provider; and
a peripheral device coupled to said telephone switch for providing a calling party associated with a call detected by said trigger with a password to be used when obtaining access to a service provided by said service provider, said service requiring use of said calling party number.

15. The system of claim 14, further comprising:
a database accessible by said service control point for storing said password and said calling party number.

16. The system of claim 15, wherein said service control point further includes:
control logic for accessing said database and retrieving said stored password in response to a call, detected by said trigger, from said stored calling party number.

17. The system of claim 15, wherein said database further includes an associated telephone number stored in said database in association with said password and said calling party number.

18. The system of claim 17, wherein said service control point control logic further includes;
logic for accessing said database and retrieving said stored password in response to a call, detected by said trigger, from said stored associated telephone number.

19. The system of claim 15, wherein said service control point further includes:
means for receiving updated password information from said service provider and for updating a password associated with a telephone number in said database in response to receiving said updated password information.

20. A method for providing an ENUM registration service, comprising the steps of:
operating a telephone switch to detect a call including a calling party number directed to a telephone number corresponding to an ENUM registration service provider;
retrieving, from a line information database of telephone service subscriber information, information corresponding to said calling party number; supplying at least some of the retrieved telephone service subscriber information to said ENUM registration service provider; and
operating a telephone network element to provide the calling party with a password to be used when supplying ENUM registration information to the ENUM registration service provider via the Internet, an ENUM registration service provide by said ENUM registration service provider requiring use of said calling party number.

21. The method of claim 20, further comprising:
storing said password and said calling party number in a database; and
retrieving, using calling party number information included in a second call directed to said ENUM registration service provider from said calling party number, said stored password.

22. The method of claim 21, further comprising the step of:
updating said stored password to a new password when said password is modified by said ENUM registration service provider in response to information received from a party providing said stored password and said calling party number via the Internet to said ENUM registration service provider.

* * * * *